US008468150B2

(12) United States Patent
Attaluri et al.

(10) Patent No.: US 8,468,150 B2
(45) Date of Patent: Jun. 18, 2013

(54) ACCOMMODATING GAPS IN DATABASE INDEX SCANS

(75) Inventors: Gopi K. Attaluri, San Jose, CA (US); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 13/285,249

(22) Filed: Oct. 31, 2011

(65) Prior Publication Data

US 2013/0110819 A1    May 2, 2013

(51) Int. Cl.
  *G06F 17/30* (2006.01)
  *G06F 7/00* (2006.01)

(52) U.S. Cl.
  USPC .......................................... 707/714

(58) Field of Classification Search
  USPC .......................................... 707/714
  See application file for complete search history.

(56) References Cited

U.S. PATENT DOCUMENTS

| | | | |
|---|---|---|---|
| 6,513,028 B1 | 1/2003 | Lee et al. | |
| 6,578,026 B1 | 6/2003 | Cranston et al. | |
| 7,356,542 B2 | 4/2008 | Gupta et al. | |
| 7,836,036 B2 | 11/2010 | Bhattacharjee et al. | |
| 7,895,189 B2 | 2/2011 | Balmin et al. | |
| 7,945,569 B2 | 5/2011 | Drory et al. | |
| 2005/0147296 A1* | 7/2005 | Hilton et al. | 382/170 |
| 2005/0198008 A1 | 9/2005 | Adler | |
| 2008/0046473 A1 | 2/2008 | Miao et al. | |
| 2009/0006447 A1 | 1/2009 | Balmin et al. | |
| 2009/0055352 A1 | 2/2009 | Corvinelli et al. | |
| 2009/0063527 A1 | 3/2009 | Corvinelli et al. | |
| 2009/0083292 A1* | 3/2009 | Bhattacharjee et al. | 707/100 |
| 2012/0191716 A1* | 7/2012 | Omoigui | 707/740 |

OTHER PUBLICATIONS

Kriegel et al., "Acceleration of Relational Index Structures Based on Statistics", Proceedings, 15th SSDBM, Cambridge, MA USA, 2003, 4 pages.
Lang et al., "Increasing Buffer-Locality for Multiple Index Based Scans Through Intelligent Placement and Index Scan Speed Control", VLDB, Sep. 23-28, 2007, pp. 1298-1309.

* cited by examiner

*Primary Examiner* — Kuen Lu
(74) *Attorney, Agent, or Firm* — Elissa Y. Wang, Edell, Shapiro & Finnan LLC (57) ABSTRACT

According to a present invention embodiment, a system conducts a scan on a database object index with one or more gaps. The system generates one or more combinations of values for the gaps within an index with respect to an operation. Each combination of values is generated by scanning the index based on a combination of one or more scan values, adjusting a value for a gap based on scan results, and adjusting the scan values for a succeeding scan based on the scan results to reduce a quantity of scans. The index includes at least two database object elements. One or more scans of the index utilizing the combinations of values are conducted to retrieve data from the database and accommodate each gap in the index. Present invention embodiments further include a method and computer program product for conducting the index scan.

24 Claims, 5 Drawing Sheets

ACCOMMODATING GAPS IN DATABASE INDEX SCANS

BACKGROUND

1. Technical Field

Present invention embodiments relate to index scans within databases, and more specifically, to efficiently accommodating gaps in the index scans.

2. Discussion of the Related Art

Database systems utilize indexes to enhance retrieval of data. Basically, an index produces a data set including and ordered by designated columns of a database table in order to enable rapid retrieval of data and avoid scanning substantial portions or the entirety of a database table. The index data set includes rows of the designated columns each with pointers to the corresponding rows in the database table containing the desired data. For example, a table, T1, with columns $c_1$, $c_2$, $c_3$, $c_4$ and $c_5$ may include a composite index (e.g., an index including two or more columns of a database table), I1 for columns $c_1$, $c_2$, $c_3$, and $c_4$ of table T1. The index provides a data set with rows sorted by the values of columns $c_1$, $c_2$, $c_3$, and $c_4$ in this specific order. In other words, when a column includes two or more of the same values, the corresponding rows are sorted in the index data set by the value in a subsequent column of the index (e.g., when two or more of the same values reside in column $c_1$, the corresponding rows are sorted by the value of column $c_2$).

However, certain queries may present processing inefficiencies for a composite index. For example, a query for table T1 may include the following.

SELECT *
FROM T1
WHERE $c_2$=20

This query retrieves rows from table T1 where the values of column $c_2$ are 20. In this case, since column $c_1$ is not constrained, start and stop keys cannot be used, thereby requiring all of the data in the index data set to be scanned to identify values of 20 within column $c_2$. Column $c_1$ provides a gap in the index for this example.

As a further example, a query for table T1 may include the following.

SELECT *
FROM T1
WHERE $c_1$ BETWEEN 1 AND 10
AND $c_2$=100

This query retrieves rows from table T1 where the values of column $c_1$ are between 1 and 10, and the values of column $c_2$ are 100. A query optimizer of the database system can generate an index scan (e.g., scan of the data set corresponding to the index) with a start key (for column $c_1$) of 1 and a stop key (for column $c_1$) of 10 to apply the first predicate ($c_1$ BETWEEN 1 AND 10) on column $c_1$. In order to satisfy the query, the second predicate ($c_2$=100) on column $c_2$ needs to be applied to the matching keys returned by the index for column $c_1$. The second predicate ($c_2$=100) can be applied as an index predicate, but cannot be added to the start/stop keys for column $c_1$ since b-tree index technology employed by a typical relational database system does not allow a range to be specified for a leading column (e.g., column $c_1$). Column $c_1$ is known as a gap in the index.

BRIEF SUMMARY

According to one embodiment of the present invention, a system conducts a scan on an index of a database object and accommodates one or more gaps within the index with respect to an operation. The system comprises a computer system including at least one processor. The system generates one or more combinations of values for one or more gaps within an index with respect to an operation. Each combination of values is generated by scanning the index based on a combination of one or more scan values, adjusting a value for a gap in a current combination of values to produce a succeeding combination of values based on scan results, and adjusting the combination of scan values for a succeeding scan based on the scan results to reduce a quantity of scans for determining the one or more combinations of values for the one or more gaps. The index includes a composite index that encompasses at least two elements of the database object. The system further conducts one or more scans of the index utilizing the one or more combinations of values to retrieve data from the database and accommodate each gap in the index with respect to the operation. Embodiments of the present invention further include a method and computer program product for conducting a scan on an index of a database object in substantially the same manner described above.

DETAILED DESCRIPTION

Present invention embodiments pertain to efficient handling of gaps within an index of a database system. A jump scan of a present invention embodiment enables a database system to accommodate one or more gaps in index start/stop keys, thereby significantly reducing the number of fetched index pages and execution time.

Basically, an index produces a data set or table including and ordered by designated columns of a database table in order to enable rapid retrieval of data and avoid scanning substantial portions or the entirety of a database table. The data set or index table includes rows of the designated columns each with pointers to the corresponding rows in the database table containing the desired data. For example, a table, T2, with columns $c_1$, $c_2$, $c_3$, $c_4$ and $c_5$ may include a composite index (e.g., an index including two or more columns of a database table), I2, for columns $c_1$, $c_2$, $c_3$, and $c_4$ of table T2. An index, I2, for table T2 may produce the following example data set or index table.

Index I2

| Row | Column c1 | Column c2 | Column c3 | Column c4 |
|-----|-----------|-----------|-----------|-----------|
| 1 | 1 | 1 | 30 | 40 |
| 2 | 1 | 2 | 300 | 400 |
| 3 | 2 | 1 | 30 | 40 |
| 4 | 2 | 20 | 300 | 400 |
| 5 | 3 | 2 | 3000 | 4000 |
| 6 | 3 | 200 | 3 | 4 |

The index I2 provides a data set or index table with rows sorted by the values of columns c1, c2, c3, and c4 in this specific order. In other words, when a column includes two or more of the same values, the corresponding rows are sorted in the data set or index table by the value in a subsequent column of the index (e.g., when two or more of the same values reside in column c1, the corresponding rows are sorted by the value of column c2).

A query for table T2 may include the following.
SELECT *
FROM T2
WHERE c2=20

This query retrieves rows from table T2 where the values of column c2 are 20. In this case, since no predicate or values for column c1 are provided, all of the data in the index data set or table needs to be scanned to identify values of 20 within column c2. Column c1 is referred to as a gap in the index.

There may be various types of gaps in an index. In the above example, column c1 is referred to as an unconstrained gap. A further query for table T2 may include the following.
SELECT *
FROM T2
WHERE c2>20
AND c3=30

This query retrieves rows from table T2 where the values of column c2 are greater than 20 and the values of column c3 are 30. In this case, no predicate or values for column c1 are provided, while column c2 is constrained to values greater than 20. Columns c1 and c2 are gaps in the index, where column c1 is an unconstrained gap as described above and column c2 is a constrained gap (e.g., several records may still need to be searched in the index but the range is somewhat constrained by the predicate).

In addition, a query of the following type may be provided.
SELECT *
FROM T2
WHERE c2=20
AND c4>40

This query retrieves rows from table T2 where the values of column c2 equal 20 and the values of column c4 are greater than 40. In this case, there is a combination of gaps and non-gaps in the index. Columns c1 and c3 are unconstrained gaps, while columns c2 and c4 (since column c4 is the final index column) are non-gaps in the index.

Present invention embodiments provide several advantages with respect to accommodating index gaps. In particular, present invention embodiments provide a highly flexible and powerful mechanism that supports plural gaps of different types, where the gaps may occur together or be separated by non-gap columns. The gaps may be unconstrained (e.g., no predicate on column c1 in the above example query), partially constrained (e.g., only the start or stop predicate (e.g., inequality) on column c1 in the above example query), or fully constrained (e.g., both start and stop predicates (e.g., equality) on column c1 as illustrated above). Several optimizations are employed by present invention embodiments to minimize the cost of a jump scan and reduce the number of internal index scans that are typically needed to accommodate a gap in the index.

Further, present invention embodiments provide rich functionality that enables a user/caller to specify the gaps and non-gaps and reposition the non-gaps. Moreover, present invention embodiments provide optimization for a jump scan on a range partitioned (RP) table, and manners to parallelize a jump scan in a symmetric multiprocessing (SMP) or other parallel processing environment.

Figure 1:
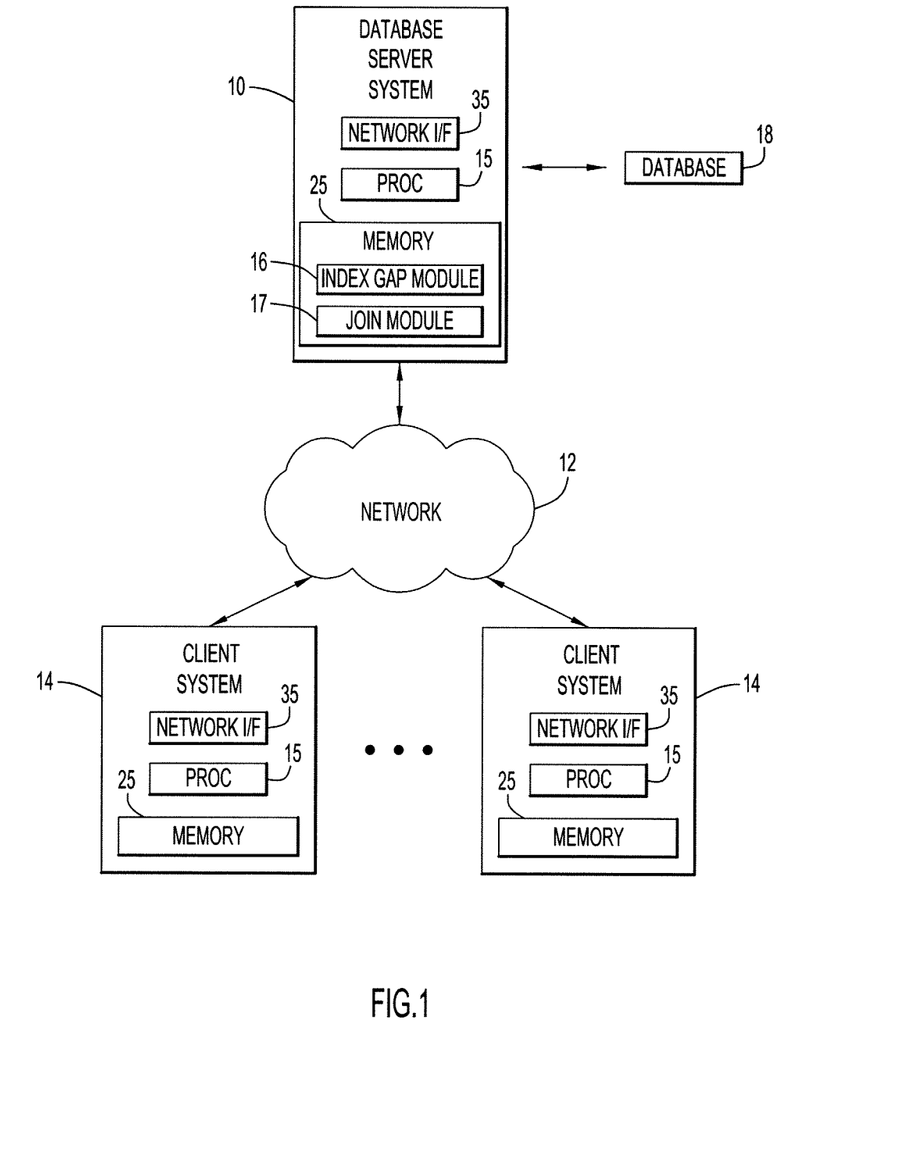
FIG. 1 is a diagrammatic illustration of an example computing environment for use with an embodiment of the present invention.

An example environment for use with present invention embodiments is illustrated in FIG. 1. Specifically, the environment includes one or more database or other server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to submit database or other queries to server systems 10 to retrieve information from a database system 18 for various applications. The server systems include an index gap module 16 to process gaps within a database index as described below, and a join module 17 to employ the jump scan of a present invention embodiment for a zig-zag join operation as described below. The index gap and join modules may reside on the server system as separate modules or be embedded within other modules of the server system. By way of example, the index gap and join modules may reside within one or more components of an IBM DB2 engine (e.g., optimizer, code generator, runtime, index manager, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired query, and may provide reports including results (e.g., final results of queries or operations, etc.).

Server systems 10 and client systems 14 may be implemented by any conventional or other computer systems preferably equipped with a display or monitor, a base (e.g., including at least one processor 15, one or more memories 25 and/or internal or external network interfaces or communications devices 35 (e.g., modem, network cards, etc.)), optional input devices (e.g., a keyboard, mouse or other input device), and any commercially available and custom software (e.g., server/communications software, index gap module, join module, browser/interface software, etc.).

In addition, index gap module 16 and join module 17 may include one or more modules or units to perform the various functions of present invention embodiments described below. The various modules (e.g., index gap module, join module, etc.) of present invention embodiments may be implemented by any combination of any quantity of software and/or hardware modules or units, and may reside within memories 25 of the server systems for execution by processor 15.

Present invention embodiments provide a scheme to support plural gaps of various types, including constrained gaps (e.g., with a start value, a stop value, or both), unconstrained gaps, and plural gaps and non-gaps in any combination. Basically, present invention embodiments determine plural queries each utilizing a value for each gap in a database index. The queries cover the range of values for each gap or, in other words, the various combinations of gap values to cover the value range for each gap. The values for the gaps are determined by a position scan of the index table. The resulting queries are processed to retrieve corresponding data in a consume scan. The results of the consume scans are combined to produce the resulting data.

Figure 2:
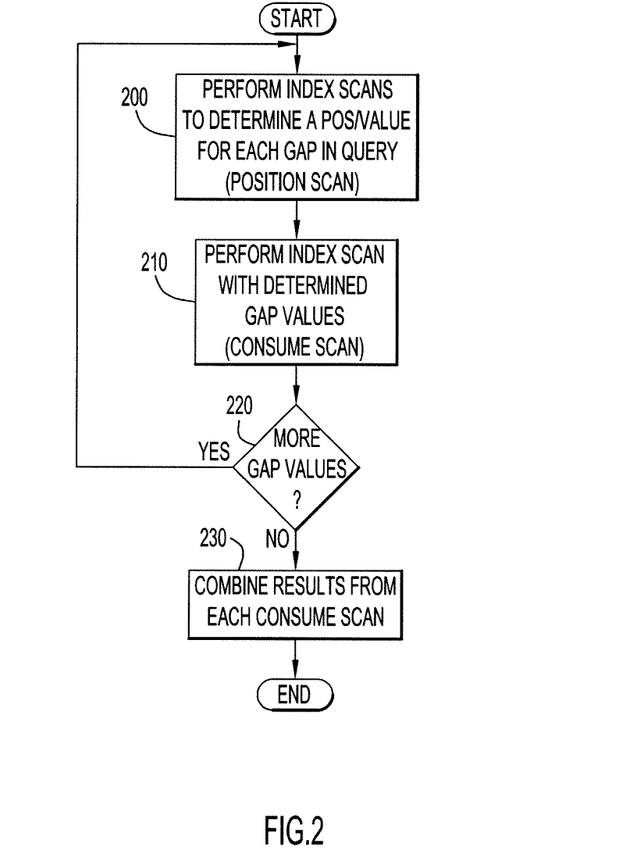
FIG. 2 is a procedural flow chart illustrating a manner in which gaps within a database index are accommodated according to an embodiment of the present invention.

A manner of accommodating gaps in a database index (e.g., via index gap module 16 and server system 10) according to an embodiment of the present invention is illustrated in FIG. 2. Initially, a query or other processing request is received including one or more gaps in a corresponding index of the database system. A value for each gap in the index is determined at step 200. This is accomplished by performing a separate internal index scan to determine a value for (or reposition) a corresponding index gap. This scan is referred to as a position scan. For example, a scan of the following form may be used as a position scan to determine a value for a gap index.

SELECT C1 FROM T WHERE C1>{CUR_C1}, where C1 is a column of a table, T, including an index, and CUR_C1 represents the current value from the column. This query basically scans the index to retrieve the next value for column C1 to serve as the gap value for the gap corresponding to column C1. Various optimizations may be employed as described below to determine gap values while reducing the quantity of index scans to be performed.

Once a value for each gap is determined (e.g., a unique combination of values for all the gaps are determined), these values are utilized to generate the start-stop keys (e.g., including one or more index columns) for an internal index scan (without any gaps). This index scan is referred to as a consume scan and is performed with the gap values at step 210 to retrieve the corresponding data from the database. When additional combinations of gap values exist as determined at step 220, the next combination of gap values is determined and corresponding data is retrieved in substantially the same manner described above.

The quantity of consume scans is determined by the total number of unique combinations for the gap values. Various optimizations may be employed to reduce the quantity of consume scans as described below. Once the consume scans for all the combinations of gap values have been performed as determined at step 220, the results from the consume scans are combined to produce the final result set at step 230.

By way of example, a query for table T2 above may include the following.

SELECT * FROM T2 WHERE c2=2

This query retrieves data from table T2 with values of column c2 equal to 2, where column c1 serves as the gap in the index. A present invention embodiment determines values for gap column c1, and produces the following consume scans with corresponding values covering the range of values (e.g., 1-3) in the gap column c1. The scans are combined (UNION) to produce the resulting data set.

SELECT * FROM T2 WHERE c1=1 AND c2=2
UNION
SELECT * FROM T2 WHERE c1=2 AND c2=2
UNION
SELECT * FROM T2 WHERE c1=3 AND c2=2

Figure 3:
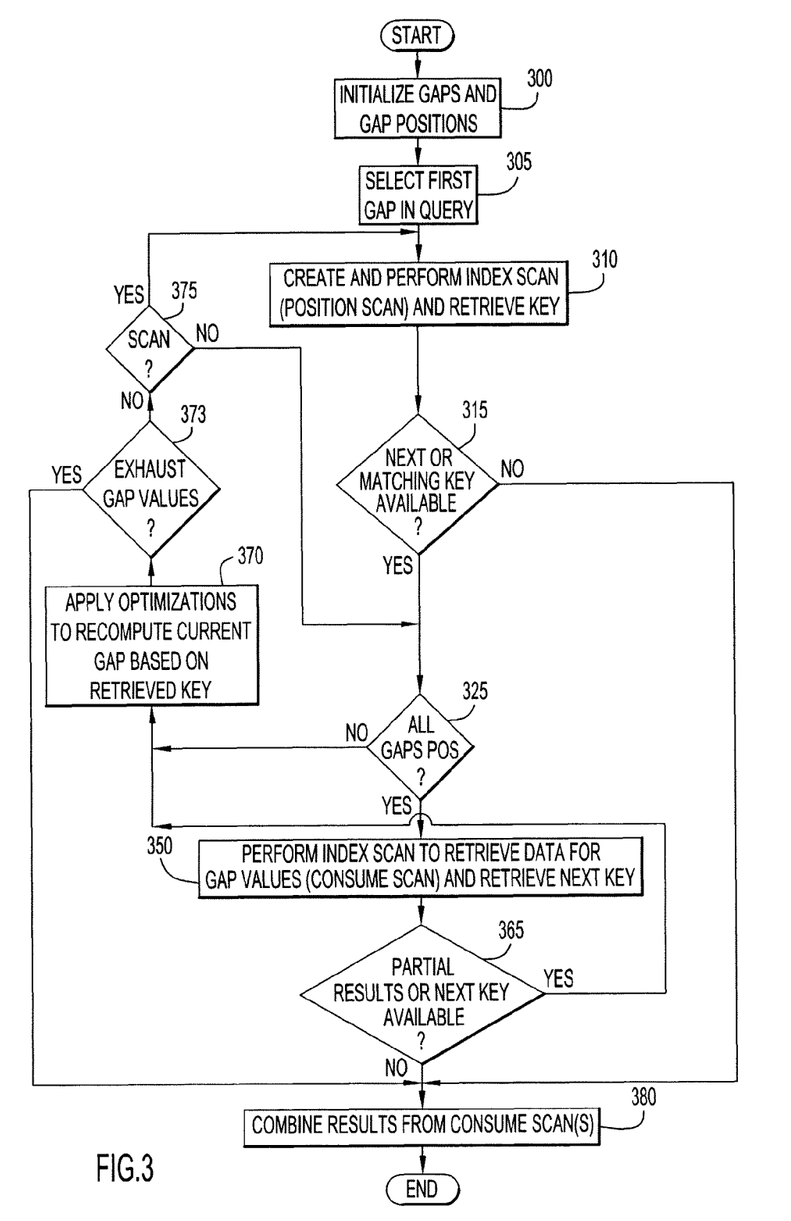
FIG. 3 is a procedural flow chart illustrating a manner in which database index scans for index gaps are performed according to an embodiment of the present invention.

A manner in which index and consume scans are generated and performed (e.g., via index gap module 16 and server system 10) to accommodate gaps in a database index according to an embodiment of the present invention is illustrated in FIG. 3. Basically, present invention embodiments determine plural queries each utilizing a value for each gap in the database index. The queries cover the range of values for each gap or, in other words, the various combinations of gap values to cover the value range for each gap. The values for the gaps are determined by a position scan. The resulting queries are processed to retrieve corresponding data from the database in a consume scan. The results of the consume scans are combined to produce the resulting data.

Initially, a query or other processing request is received with one or more gaps in a corresponding database index. The gaps and corresponding gap values (or positions) are initialized at step 300, and a first gap is selected to determine a value (or position) for that gap at step 305. The gap value (or position) is determined for the selected gap at step 310 by performing an internal index scan or position scan that identifies the next value for the selected gap and retrieves a key. For example, a scan of the following form may be used as a position scan to determine a value for a gap as described above.

SELECT C FROM T WHERE C>{CUR_C}, where C is a column of table, T, including the index and CUR_C represents the current value from the column C serving as a gap.

The position scans may accommodate any number, type (e.g., unconstrained, partially constrained, or fully constrained), and combination of gaps. However, a significant quantity of internal index scans may be required to generate all the value combinations for the gaps. In order to reduce the quantity of internal index scans, several optimizations may be performed to minimize the quantity of internal index scans or position scans. In particular, the position scan retrieves a gap value and entire matching key (e.g., including one or more index columns to uniquely identify the index row) when successful (e.g., the scan produces a value for the current gap), and a key (e.g., including one or more index columns) for the next row in the index data set or table when unsuccessful (e.g., the scan does not produce a value for the current gap). If the matching key or next key is not available (e.g., indicating exhaustion of the index and no further values for the gaps) as determined at step 315, partial results from consume scans are combined at step 380 to produce the resulting data set as described below.

If a matching key or next key is available as determined at step 315, and when further gaps need to be positioned as determined at step 325, a further gap is determined for application of optimizations at step 370. The gaps are processed in a manner to traverse the range of values for subsequent gaps (or corresponding columns) prior to progressing through the range of values for prior gaps (or corresponding columns), thereby encompassing the value ranges for all the gaps. For example, in the case where gaps exist for columns c1 and c2 of a table, the process traverses all the values for the gap corresponding to column c2 prior to progressing to the next value for the gap corresponding to column c1. This is analogous to the operation of a vehicle odometer that traverses the least significant to the most significant digits (e.g., ones, tens, hundreds, thousands, etc.) to cover all possible values in an incremental fashion.

Once a gap is selected as the current gap, optimizations are applied to recompute the gap value (or position) based on the retrieved next or matching keys at step 370 in order to reduce the quantity of position scans performed as described below. Once the optimizations are applied at step 370 and do not exhaust the gap values (e.g., no further values for, or repositioning of, the gaps exist) as determined at step 373, a position scan may be performed on the index or bypassed as determined at step 375. The position scan is bypassed in response to an optimization repositioning or setting the gap to a specific value based on the matching or next key as described below. If the optimizations exhaust the gap values (e.g., no further values for, or repositioning of, the gaps exist) as determined at step 373, the results from consume scans are combined to produce the resulting data set at step 380 as described below.

The above process is repeated until a value for each gap is identified as determined at step 325. Once a value for each gap is determined, an index scan or consume scan is performed with the determined combination of gap values to retrieve corresponding data (or partial results) from the database and a key at step 350. The consume scan retrieves partial results while successful, and retrieves a complete key (e.g., including one or more index columns) for the next row in the index data set or table when unsuccessful. When partial results or the next key is available as determined at step 365, the gap value (or position) is optimized at step 370 in order to reduce the quantity of position and/or consume scans performed as described above.

The above process is repeated until a consume scan is performed to retrieve data for all valid combinations of gap values after application of the optimizations (e.g., a next key is unavailable after a consume scan indicating exhaustion of the index) as determined at step 365. Once the loop terminates, the partial results retrieved by each of the consume scans is combined to produce a resulting data set at step 380.

Optimizations are applied to adjust gap values and reduce the quantity of position and consume scans as described above. The optimizations applied in relation to position scans utilize the matching and next keys to adjust gap values, while optimizations based on consume scans utilize next keys to adjust gap values. In particular, the matching key or next key is analyzed to avoid unnecessary and/or unproductive scans, and to implicitly determine values for (or position) one or more gaps. Accordingly, a next possible position scan is identified from the keys that may be productive, where the next key or the matching key indicate the value (or position) of a gap. The matching key may further be utilized to position other gaps based on the matching key value.

For example, when a matching key retrieved from a successful position scan (e.g., for column c1) contains the value of "10", and a next gap (e.g., column c2) to be repositioned is constrained (e.g., a constraint of c2>5), the next gap can be repositioned or set to "10" without executing a position scan. This type of positioning may similarly apply to any other gaps within the index based on the matching key values or an adjusted value for a gap. On the other hand, if the next gap (e.g., column c2) is constrained in a fashion to produce an unproductive position scan for the next gap (e.g., a constraint of c2<10), the unproductive scan can be avoided since the matching key fails the constraint. If no further values for the current gap that satisfy the constraint exist, a previous gap (e.g., column c1) is repositioned to the next value.

When a next key (e.g., the first key beyond the stop key or search range) is retrieved from an unsuccessful (e.g., cannot find a match in the index) position or consume scan, the next key is analyzed to avoid unproductive position scans. The first position within the next key with a value different from a corresponding column value used to perform the scan identifies the column or gap for adjustment. For example, if the next key contains a new value for a first gap, and that new value satisfies a constraint for the first gap, the first gap may be repositioned or set to the new value without explicitly issuing a new position scan. Alternatively, if the next key contains a new value for the first gap, but the new value does not satisfy the constraint for the first gap, the next position scan is generated to be repositioned beyond this new value. This type of positioning may similarly apply to any other gaps within the index based on the next key values or an adjusted value for a gap.

In order to analyze the next key from the index, the next key value of a column is compared against start-stop keys for that column. This comparison can be expensive due to the frequency the comparison is performed. However, this comparison must have been made in the index before returning the next key. When the index indicates the first column that failed the start-stop key, most of the comparisons may be avoided during the next key analysis. In all of the above optimizations, the predicates on the constrained gaps are utilized to determine values for (or reposition) the gaps.

Figure 4:
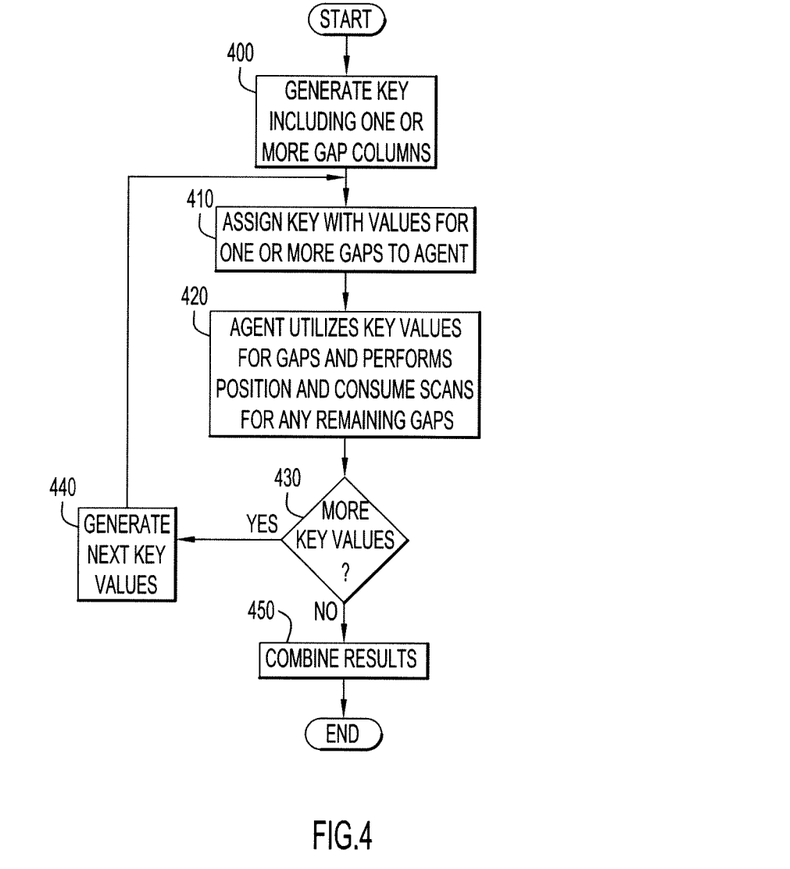
FIG. 4 is a procedural flow chart illustrating a manner in which index gap processing is performed in parallel according to an embodiment of the present invention.

The processing to accommodate gaps may be performed in parallel in a symmetric multiprocessing (SMP) or other parallel processing environment. A manner to partition gap processing for parallel processing (e.g., via index gap module 16 and server system 10) is illustrated in FIG. 4. Specifically, a parallel processing key is generated to include one or more index gaps (e.g., starting from a first gap column) at step 400. The parallel processing key is associated with values (or position) for each of the key columns. In other words, the parallel processing key identifies the gap columns, while corresponding values for the key provide a combination of values for the gaps within the key. A set of values for one or more gaps within the parallel processing key is assigned to a single agent or thread (e.g., of server system 10) at step 410. The agent utilizes the key values for the corresponding gaps in the key columns, and handles or provides values for any remaining gaps using appropriate position and consume scans at step 420 in substantially the same manner described above.

When additional key values (or combination of gap values) exist as determined at step 430, the next set of values for the parallel processing key is generated at step 440. This may be accomplished by positioning or setting the last parallel processing key column to the next value (e.g., the key columns are positioned or set to the next value to generate all possible key values). This is analogous to the operation of a vehicle odometer that traverses the least significant to the most significant digits (e.g., one, tens, hundreds, thousands, etc.) to cover all possible values in an incremental fashion. The newly generated set of key values is assigned to an available agent at step 410 as described above.

When all the parallel processing key values are assigned to agents (and processed) as determined at step 430, the data retrieved by the various agents from the consume scans are combined to produce the resulting data set at step 450. This parallel scheme is more efficient (and appropriate) for present invention embodiments than the scheme for the conventional straw scan model (e.g., where a large index scan is divided up into small ranges and each range is assigned to an agent) since the jump scan of present invention embodiments is not constructed of a single large index scan.

The scheme of present invention embodiments parallelizes a jump scan to execute plural threads or agents concurrently and exploit multiple processors. The parallel processing key partitions the workload between plural threads or agents, where the key includes only (one or more) gap columns, and determines the manner in which the position and consume scan workload is distributed among the threads or agents. An optimizer of the database system may select the best option for a given scenario based on table statistics and the query predicates.

For example, a parallel processing key may include only a first gap. In this case, a jump scan of a present invention embodiment is partitioned on the first gap value, where each value for this gap is assigned to an available thread or agent. The thread or agent performs the position and consume scans for the remaining gaps with the value for the first gap. The thread or agent becomes available in response to finishing the processing for the first gap value. All of the processing is parallelized, except for the task of determining the next value for the first gap (which is assigned to an available thread).

When the parallel processing key contains all the gap columns, a jump scan of a present invention embodiment is partitioned on all the gap columns. In other words, each combination of gap values is processed in parallel. A consume scan is assigned to an available thread or agent. Once the consume scan is completed, the thread or agent is available for further tasks. In this case, the consume scans are processed independently and in parallel. However, the task of determining the start-stop keys for the next consume scan is performed under a latch.

Moreover, when the parallel processing key includes all of the gap columns, the work for each consume scan may be distributed among the threads or agents. When a consume scan is completed, the next consume scan is determined and the corresponding work for the scan is distributed among the threads or agents. This scenario minimizes uneven distribution of work among the threads or agents since the agents receive a fixed amount of work for each consume scan.

In addition, the parallel processing key may include all gap columns up to and including an intermediate gap. In this case, a jump scan of a present invention embodiment is partitioned on all the gap columns up to the intermediate gap. Each agent receives a corresponding combination of values for gaps within the key, and performs position and consume scans for the remaining gaps within the key. This scenario is a generalization of the above scenarios, and allows the optimizer of the database system to control the amount of work done under a latch.

There may be situations (e.g., a zig-zag join that supports gaps) where a user or process identifies the gap and non-gap columns, and repositions or determines a gap value for the non-gap columns. These situations may include plural gaps and non-gaps, where these gaps and non-gaps may be combined in any order. A user interface (e.g., provided by index gap module 16 and/or join module 17 and server system 10 via client system 14) enables the user to identify the gap columns (along with corresponding constraints) and non-gap columns in an index key. The jump scan of a present invention embodiment repositions or determines values for the gaps to cover all combinations of gap values. Control is returned to the user or process when a non-gap needs to be repositioned, and the jump scan regains control after the repositioning.

Present invention embodiments may be employed with various processing that encounters index gaps. For example, a zig-zag join operation involves one or more dimension tables and a fact table. Each dimension table has a unique key index, and the fact table has a composite index to cover all the unique keys of the dimension tables. These composite index columns are joined with the unique key columns of the dimension tables. The composite index may include a non-joining column before all the joining columns, or in between two joining columns. This non-joining column is considered to be a gap, and may be constrained (e.g., has a comparison predicate (including equality)) or unconstrained (no comparison predicate).

A zig-zag join operation may utilize the composite index on the fact table, and may be expressed by the following example.
SELECT *
FROM F, D1, D2
WHERE fc2=D1.d1c1 AND fc3=D2.d2c1
where D1 and D2 are dimension tables with corresponding columns d1c1 and d2c1, F is the fact table, and the fact table, F, has an index on columns fc1, fc2, fc3. In this case, a conventional zig-zag join cannot be utilized since the fact table index column fc1 is not joined with a dimension table.

A further example of a zig-zag join operation may be the following.
SELECT *
FROM F, D1, D2
WHERE fc1>10 and fc2=D1.d1c1 and fc3=D2.d2c1
where D1 and D2 are dimension tables with corresponding columns d1c1 and d2c1, F is the fact table, and the fact table, F, has an index on columns fc1, fc2, fc3. In this case, a conventional zig-zag join cannot be utilized since the fact table index column fc1 does not include a join predicate.

The zig-zag join operation basically operates between the fact and dimension tables to join columns. In particular, the dimension table index columns are positioned on the first value. The current index key values of the dimension tables are concatenated, and an index scan is performed on the fact table to produce scan results. The next key is obtained when the fact table index scan completes. The dimension table index columns are positioned to match or exceed the next key. This may be accomplished by scans of the dimension table index columns. The process continues to update the dimension table index columns and perform fact table index scans until the next key is not available or the dimension table index columns cannot be repositioned. The results of the fact table index scans are combined to produce the resulting data set for the join operation.

Gaps in the composite index of a zig-zag join operation may be accommodated by employing the jump scan of present invention embodiments. With respect to the zig-zag join, a non-gap is a fact table index column that is joined with a dimension table unique key column, and a gap is any fact table index column that is not joined with any dimension table unique key column. The zig-zag join of present invention embodiments requires both the gaps and non-gaps to be repositioned to fully and correctly materialize the results of joining the fact and dimension tables.

The zig-zag join extends the jump scan of present invention embodiments to reposition each gap to cover all possible values and ensure complete results. Control is transferred from the jump scan to reposition a non-gap (e.g., to the user or process invoking the jump scan). The jump scan of present invention embodiments allows non-gaps to be repositioned by the user (or calling process) as described above. The zig-zag join is responsible for repositioning these non-gaps by repositioning the corresponding dimension table index columns.

When the jump scan determines that no more matching keys can be found in the fact table index for the current value of a non-gap, control is transferred back to the zig-zag join process to determine values for the non-gaps. The jump scan may further identify the non-gap that needs repositioning, and provide the reason for repositioning that non-gap (e.g., a fact table index scan with a non-gap value returning no records, whereby the non-gap needs to be repositioned to the next value; a fact table index scan with a non-gap value returning no records, but returning feedback about the first non-matching key (e.g., the stop-key), whereby the non-gap needs to be repositioned to match or exceed this stop-key feedback; and a senior gap (e.g., more significant column that is a gap) being repositioned, whereby the non-gap needs to be repositioned to its first value).

Figure 5:
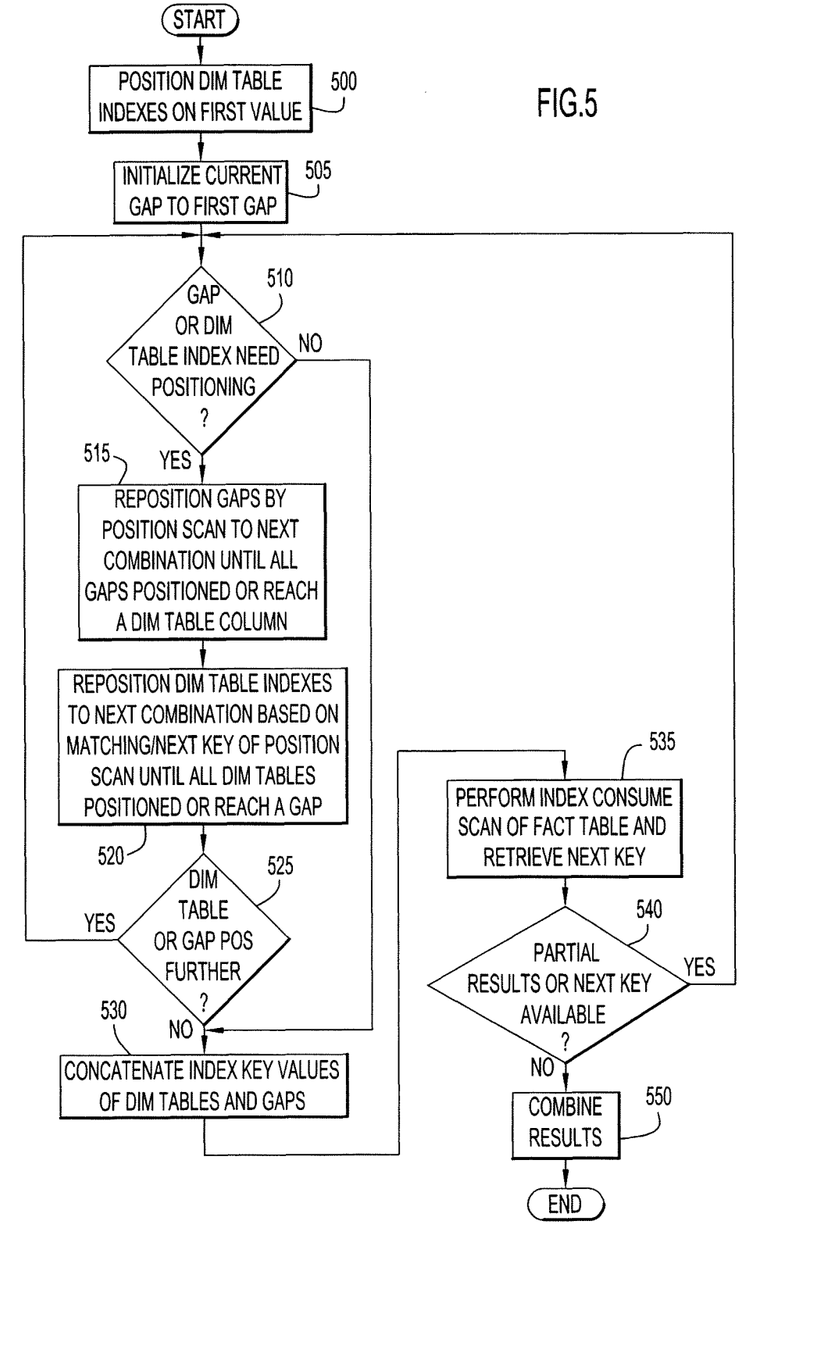
FIG. 5 is a procedural flow chart illustrating a manner in which index gaps within a zig-zag join operation are accommodated according to an embodiment of the present invention.

A manner of conducting a zig-zag join operation including one or more index gaps (e.g., via join module 17 (and optionally index gap module 16), and server system 10) is illustrated in FIG. 5. Initially, a zig-zag join operation is initiated to join a fact table with one or more dimension tables, where the zig-zag join includes one or more gaps in the composite index of the fact table. The index columns for the dimension tables are each set or positioned to a corresponding first value at step 500. This may be accomplished by performing index scans on the dimension tables. Further, a current gap column is set to the first gap column in the fact table index at step 505.

When a gap column or dimension table index column needs a value (or to be positioned) as determined at step 510, the position scan process of the jump scan described above (FIGS. 2-3) is employed at step 515 to determine values for (or reposition) gap columns to the next combination of values in substantially the same manner described above. This determination of gap values is performed for the gap columns until values for all gap columns have been determined or until a dimension table column (e.g., non-gap) is encountered. The matching key (e.g., from a successful scan) or next key (e.g., from an unsuccessful scan) from the most recent position scan is maintained.

Values for (or repositioning of) the dimension table index columns are determined at step 520 to produce a next combination of values for the dimension table index columns based on the matching key or next key from the position scan for the gap value determination or a consume scan. The dimension table index column values may be determined from index scans of the dimension tables. This determination of table index column values is performed until values for all dimension table index columns have been determined or until a gap column is encountered.

When the dimension table index columns or gap columns can be positioned further as determined at step 525, the above process is repeated to determine further values for the dimension table index columns and gap columns. Once a combination of values for the gap columns and dimension table index columns has been determined, the values for the gap columns and dimension table index columns are concatenated appropriately at step 530 to perform a consume scan of the fact table index to retrieve partial results at step 535. The fact table index consume scan retrieves partial results while successful, and retrieves a complete key (e.g., including one or more index columns) for the next row in the index data set or table when unsuccessful. When partial results or the next key is available as determined at step 540, the values for (or repositioning of) the dimension table index columns and gap columns are determined as described above.

Once the next key is not available (e.g., the values for the gap columns and dimension table index columns have been processed) as determined at step 540, the partial results retrieved by each of the fact table index consume scans is combined to produce a resulting data set at step 550. The gap processing for zig-zag join operations may be performed in parallel in a symmetric multiprocessing (SMP) or other parallel processing environment in substantially the same manner described above. Further, other aspects of processing zig-zag join operations may similarly be performed in parallel.

The jump scan of present invention embodiments may be applied to range partitioned (RP) tables. Initially, a range partitioned (RP) table is a database table partitioned into one or more internal tables based on the range of the partitioning columns (e.g., a key including one or more columns). Present invention embodiments accommodate a query that requires an index scan on a range partitioned (RP) table, where the index includes one or more gaps.

In the event the index on the range partitioned (RP) table is global (e.g., a single index across all of the internal tables), the query may be processed in substantially the same manner described above to accommodate the one or more index gaps.

When local indexes (e.g., one per internal table) are accessed (e.g., scan order) in a manner inconsistent with the range-partitioning key order (e.g., keys from different ranges (internal tables) are encountered), the one or more gaps are accommodated by applying the processing in substantially the same manner described above to each individual internal table. In other words, the jump scan technique of present invention embodiments is independently applied to each individual internal table.

If the local indexes are accessed (e.g., scan order) in a manner consistent with the range-partitioning key order (e.g., keys from a single range are encountered until the next internal table is processed), the jump scan technique of present invention embodiments may seamlessly be applied to the next internal table to accommodate gaps in response to reaching the end of the index for a current internal table.

It will be appreciated that the embodiments described above and illustrated in the drawings represent only a few of the many ways of implementing embodiments for accommodating gaps in database index scans.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any combination of commercially available and custom software (e.g., browser software, communications software, server software, index gap module, join module, etc.). These systems may include any types of monitors and input devices (e.g., keyboard, mouse, voice recognition, etc.) to enter and/or view information.

It is to be understood that the software (e.g., index gap module, join module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., index gap module, join module, etc.) may be available on a recordable or computer useable medium (e.g., magnetic or optical mediums, magneto-optic mediums, floppy diskettes, CD-ROM, DVD, memory devices, etc.) for use on standalone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., index information, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data (e.g., index information, etc.).

Present invention embodiments may be employed for any quantity of any types of gaps in indexes or other data structures (e.g., tables, rows, columns, etc.). The indexes and keys (e.g., index keys, parallel processing keys, etc.) may include any quantity of columns or other database object elements, and any quantity of gaps. Present invention embodiments may be applied for queries or other operations including gaps within an index or other data structure (e.g., queries, joins, etc.).

Any quantity of index or position scans may be performed to determine values for any quantity of any types of gaps. The scans may be conducted in accordance with any suitable query or processing request in any suitable query or other language to retrieve a gap value. Any quantity of index or consume scans may be performed to retrieve data for corresponding values of any quantity of any types of gaps. The consume scans may be conducted in accordance with any suitable query or processing request in any suitable query or other language to retrieve data.

The quantity of queries (or position and consume scans) may be reduced in any desired fashion based on previous results of position, consume or other index scans. For example, retrieved keys from the scans may be analyzed to selectively provide values for current or subsequent gaps without performing a scan (e.g., to obviate unproductive scans (e.g., scans that provide data non-compliant with desired criteria (e.g., constraints, etc.))). The gap values may alternatively be determined in any desired fashion (e.g., mathematical or other determination, provided by a user or process, predetermined, based on knowledge of the database, etc.). The results from the consume scans may be combined in any fashion to provide the final result set (e.g., union, removal of duplicates, criteria, etc.).

Processing of the jump scan may be partitioned in any desired fashion and based on any desired criteria (e.g., index range values, keys or columns, etc.) for parallel processing. The parallel processing key may include any quantity of columns and any quantity of any types of gaps. The partitioning may be based on any quantity of gaps, and any quantity of values for the gaps. An agent or thread may be assigned and process any quantity of parallel processing keys.

Present invention embodiments may be utilized for any desired operations encountering gaps in indexes or other data structures (e.g., any types of joins, etc.). The zig-zag join may be associated with any quantity of fact and dimension tables, where the table indexes may include any quantity of columns.

Present invention embodiments may be applied to range partitioned (RP) tables in any fashion (e.g., to individual internal tables, collectively to all internal tables, to a sequence of internal tables, etc.) based on arrangements of the partitioning and indexes (or keys). The range partitioned (RP) tables may be partitioned based on any desired criteria (e.g., index ranges, internal tables, etc.).

Present invention embodiments may employ any number of any type of user interface (e.g., Graphical User Interface (GUI), command-line, prompt, etc.) for obtaining or providing information (e.g., queries, gaps, non-gaps, gap and/or non-gap positions or values, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for accommodating gaps in any processing requests to process any suitable data structures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of conducting a scan on an index of a database object and accommodating one or more gaps within the index with respect to an operation comprising:
generating one or more combinations of values for one or more gaps within an index with respect to an operation, wherein generating each combination of values includes:
scanning the index based on a combination of one or more scan values;

adjusting a value for a gap in a current combination of values to produce a succeeding combination of values based on scan results; and adjusting the combination of scan values for a succeeding scan based on the scan results to reduce a quantity of scans for determining the one or more combinations of values for the one or more gaps, wherein the index includes a composite index that encompasses at least two elements of the database object; and conducting one or more scans of the index utilizing the one or more combinations of values to retrieve data from the database and accommodate each gap in the index with respect to the operation.

2. The method of claim 1, wherein the database object includes a range-partitioned table.

3. The method of claim 1, further including:
enabling identification of database object elements with gaps by one of a user and a process; and
enabling adjustment of positions in the index of database object elements without gaps by one of the user and process.

4. The method of claim 1, further including:
partitioning the processing for generating the one or more combinations of values and conducting the one or more scans among two or more threads of the computer to be performed in parallel, wherein the partitioning is based on a key including one or more gaps.

5. The method of claim 1, wherein the gaps within the index include at least one of a constrained gap and an unconstrained gap.

6. The method of claim 1, wherein adjusting the combination of scan values further includes:
adjusting the combination of scan values based on one of a matching key ascertained during the scanning of the index and a succeeding key for a corresponding database element.

7. The method of claim 1, wherein the operation includes a query.

8. The method of claim 1, wherein the operation includes a zig-zag join.

9. A system for conducting a scan on an index of a database object and accommodating one or more gaps within the index with respect to an operation comprising:
a computer system including at least one processor configured to:
generate one or more combinations of values for one or more gaps within an index with respect to an operation, wherein generating each combination of values includes:
scanning the index based on a combination of one or more scan values;
adjusting a value for a gap in a current combination of values to produce a succeeding combination of values based on scan results; and
adjusting the combination of scan values for a succeeding scan based on the scan results to reduce a quantity of scans for determining the one or more combinations of values for the one or more gaps, wherein the index includes a composite index that encompasses at least two elements of the database object; and
conduct one or more scans of the index utilizing the one or more combinations of values to retrieve data from the database and accommodate each gap in the index with respect to the operation.

10. The system of claim 9, wherein the database object includes a range-partitioned table.

11. The system of claim 9, wherein the at least one processor is further configured to:
enable identification of database object elements with gaps by one of a user and a process; and
enable adjustment of positions in the index of database object elements without gaps by one of the user and process.

12. The system of claim 9, wherein the at least one processor is further configured to:
partition the processing for generating the one or more combinations of values and conducting the one or more scans among two or more threads of the computer system to be performed in parallel, wherein the partitioning is based on a key including one or more gaps.

13. The system of claim 9, wherein the gaps include at least one of a constrained gap and an unconstrained gap.

14. The system of claim 9, wherein adjusting the combination of scan values further includes:
adjusting the combination of scan values based on one of a matching key ascertained during the scanning of the index and a succeeding key for a corresponding database element.

15. The system of claim 9, wherein the operation includes a query.

16. The system of claim 9, wherein the operation includes a zig-zag join.

17. A computer program product for conducting a scan on an index of a database object and accommodating one or more gaps within the index with respect to an operation comprising:
a computer readable storage medium having computer readable program code embodied therewith, the computer readable program code comprising computer readable program code configured to:
generate one or more combinations of values for one or more gaps within an index with respect to an operation, wherein generating each combination of values includes:
scanning the index based on a combination of one or more scan values;
adjusting a value for a gap in a current combination of values to produce a succeeding combination of values based on scan results; and
adjusting the combination of scan values for a succeeding scan based on the scan results to reduce a quantity of scans for determining the one or more combinations of values for the one or more gaps, wherein the index includes a composite index that encompasses at least two elements of the database object; and
conduct one or more scans of the index utilizing the one or more combinations of values to retrieve data from the database and accommodate each gap in the index with respect to the operation.

18. The computer program product of claim 17, wherein the database object includes a range-partitioned table.

19. The computer program product of claim 17, wherein the computer readable program code further comprises computer readable program code configured to:
enable identification of database object elements with gaps by one of a user and a process; and
enable adjustment of positions in the index of database object elements without gaps by one of the user and process.

20. The computer program product of claim 17, wherein the computer readable program code further includes computer readable program code configured to:

partition the processing for generating the one or more combinations of values and conducting the one or more scans among two or more threads of a computer system to be performed in parallel, wherein the partitioning is based on a key including one or more gaps.

21. The computer program product of claim 17, wherein the gaps include at least one of a constrained gap and an unconstrained gap.

22. The computer program product of claim 17, wherein adjusting the combination of scan values further includes:
   adjusting the combination of scan values based on one of a matching key ascertained during the scanning of the index and a succeeding key for a corresponding database element.

23. The computer program product of claim 17, wherein the operation includes a query.

24. The computer program product of claim 17, wherein the operation includes a zig-zag join.

* * * * *